United States Patent Office
3,306,776
Patented Feb. 28, 1967

3,306,776
GALVANIC PRIMARY CELL
Pentti J. Tamminen, Otakallio, Otaniemi, Finland
Filed Feb. 27, 1964, Ser. No. 347,834
4 Claims. (Cl. 136—107)

The present invention relates to a primary cell and particularly, but not necessarily exclusively, to an improved cell adapted to deferred action types of batteries, including a zinc anode and a cathode comprising carbon and manganese dioxide.

A conventional Lechlanché-type primary cell, which has a zinc anode and a manganese dioxide depolarizer, is generally not suitable for deferred action types of batteries, mainly because its performance at temperatures below −20° C. is very poor.

It is an object of the present invention to provide a primary cell which has a comparatively high voltage and current capability throughout at least a temperature range of −60° C. to +75° C.

This and other objects of the invention are achieved by using in connection with manganese dioxide depolarizer an electrolyte comprising about 25% hydrochloride acide, advantageously with addition of lithium chloride and mercuric chloride.

Figure 1:
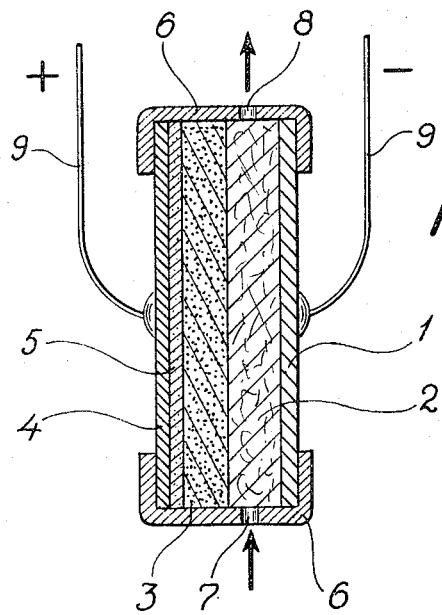
Figure 2:
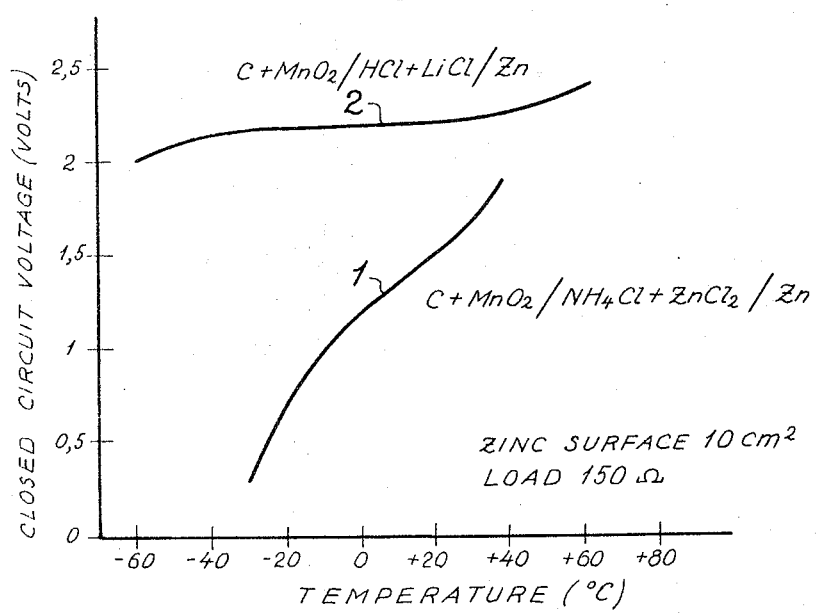

The invention will be described in greater detail with reference to the accompanying drawing, in which FIG. 1 shows a vertical cross-section of a conventional galvanic cell of this type and FIG. 2 is a diagram illustrating the advantages of using the electrolyte and depolarizer according to the present invention.

The battery cell shown in FIG. 1 comprises a zinc plate 1, which serves as anode, a separator 2 of filter paper, a cathode layer 3, comprising a porous mixture of $MnO_2$ and acetylene black, e.g. in ration 3:1, and a current collector plate 4, which may be of zinc coated on one side with a conventional graphite-carbon layer 5, such as used in flat cell batteries. The cathode layer 3 may also comprise a small amount of binder material, such as polyisobutylene. This is especially necessary if the battery is designed for short time use the cathode layer being very thin. In this case it is advantageous to mix acetylene black and manganese dioxide in about a 5% solution of polyisobutylene (medium grade) and chlorothene to a viscous paint, which is applied to the carbon layer of the cathode. Upon evaporation of chlorothene, the layer becomes porous. The so formed layer is flexible, which is a great advantage in many applications. Plastic sleeve 6 keeps the parts of the cell tightly together. This sleeve is provided with openings 7 and 8. Terminal wires 9 are soldered to metal plates 1 and 4. The battery can be activated e.g. by dipping it for some seconds in an electrolyte, preferably consisting of 100 parts of 25% HCl
10 parts of LiCl and
0.15 part $HgCl_2$ By that time the absorbent paper 2 is soaked with electrolyte, air bubbles escaping through opening 8.

The output effect obtainable immediately after activation from the battery is relatively high because of the very good conductivity of the electrolyte, and because of improved depolarization due to formation of free chlorine in status nascendi in the pores of depolarizer mix layer, as a result of reaction between HCl and $MnO_2$.

In FIG. 2 curve 1 shows how the closed circuit voltage of a conventional Leclanché-type cell depends on temperature. Curve 2 represents a corresponding curve of a similar battery incorporating the improved electrochemical system of the present invention. The voltages are measured 5 seconds after activation.

According to FIG. 2, the cell of the present invention is radically better than conventional $C/MnO_2/Zn$-type cells, especially at low temperatures. However, because of the high self discharge rate of this cell, its use is limited to such purposes only, where reasonably high currents with good voltage stability are needed for relatively short periods. Such batteries have use for e.g. meteorological apparatuses.

The lithium chloride in the electrolyte improves the voltage especially at lower temperatures, and the mercuric chloride reduces the gassing of the anode plate. If the operating temperature is low, the LiCl percentage can be up to 20% of the amount of HCl, and the $HgCl_2$ percentage may be less than 0.15% or it can even be omitted. For reducing the self discharge at higher temperatures (above +20° C.) the percentage of LiCl should be less and the percentage of $HgCl_2$ higher than the indicated preferred values, which give a reasonable good performance over the whole temperature range (−60° C. to +75° C.)

Instead of zinc, magnesium can be used as anode material. In this case the cell voltage is above 3 volts and the immediate output effect is correspondingly higher. Yet the self discharge is so high that the battery is usable for a few minutes only. Aluminium, too, can be used, and it gives a slightly poorer performance than zinc. Naturally alloys of these metals in various combinations can also be used. For most purposes zinc is preferred.

Sometimes it is advisable to use considerably lower HCl concentrations than 25%, such as 5 to 15%, for reducing the self discharge when the battery is not intended for extremely low temperature use. This is true especially when using magnesium anodes.

The embodiments of the invention in which an exclusive property or privilege is claimed are defined as follows:
What is claimed is:

1. A galvanic primary cell for wet deferred action batteries comprising a metal cathode coated with a layer consisting of powdered carbon, powdered manganese dioxide, and a plastic binder material, an electrolyte consisting of water, at least 15% of hydrochloric acid, and lithium chloride, said lithium chloride being in an amount not more than 10%, and a soluble metal anode selected from the group consisting of zinc, magnesium, aluminum, and alloys of said metals.

2. A galvanic primary cell for wet deferred action batteries comprising a metal cathode coated with a layer consisting of powdered carbon, powdered manganese dioxide, and an electrolyte consisting of water, hydrochloride acid, lithium chloride, said lithium chloride being in an amount not more than 10%, and mercuric chloride, said mercuric chloride being in an amount not more than 0.15%, the amount of hydrochloric acid being at least 15% of the electrolyte solution, and a soluble metal anode selected from the group consisting of zinc, magnesium, aluminum, and alloys of said metals.

3. A galvanic primary cell for wet deferred action batteries comprising a metal cathode coated with a layer consisting of powdered carbon, powdered manganese dioxide, and a plastic binder material, an electrolyte consisting of water, at least 15% of hydrochloric acid, and mercuric chloride, said mercuric chloride being in an amount not more than 0.15% and a soluble metal anode selected from the group consisting of zinc, aluminum, and alloys of said metals.

4. A galvanic primary cell for wet deferred action batteries comprising a metal cathode coated with a layer consisting of powdered carbon, powdered manganese dioxide, and a plastic binder material, an electrolyte consisting of approximately 100 parts of 25% hydrochloric acid, approximately 10 parts of lithium chloride, and approximately 0.15 part of mercuric chloride, and a soluble metal anode selected from the group consisting of zinc, magnesium, aluminum, and alloys of said metals.

References Cited by the Examiner
UNITED STATES PATENTS

| | | | |
|---|---|---|---|
| 387,679 | 8/1888 | Fitch | 136—155 |
| 2,279,575 | 4/1942 | Lawson | 136—154 |
| 2,399,127 | 4/1946 | Lipinski | 136—154 |
| 2,403,571 | 7/1946 | Wilke | 136—155 |
| 2,472,379 | 6/1949 | Lawson | 136—154 |
| 2,937,219 | 5/1960 | Minnick et al. | 136—154 |

WINSTON A. DOUGLAS, *Primary Examiner.*

ALLEN B. CURTIS, A. SKAPARS,
*Assistant Examiners.*